April 18, 1933.  J. WEINBERGER  1,903,950

MOTION PICTURE THEATER AND APPARATUS

Filed Nov. 29, 1929

INVENTOR
JULIUS WEINBERGER
BY
ATTORNEY

Patented Apr. 18, 1933

1,903,950

UNITED STATES PATENT OFFICE

JULIUS WEINBERGER, OF NEW YORK, N. Y., ASSIGNOR TO RADIO CORPORATION OF AMERICA, A CORPORATION OF DELAWARE

MOTION PICTURE THEATER AND APPARATUS

Application filed November 29, 1929. Serial No. 410,445.

In the ordinary theater, the stage or screen is located at one end of the hall and the motion picture projector is located opposite the screen and towards the audience. The audience is distributed over three sides of the theater, but in the majority of cases, full utilization of the seats cannot be had because of the fact that the spectators cannot be placed at too great an angle with respect to the screen or they would see a distorted image.

The object of this invention is to overcome this objection to the ordinary theater arrangement, and provide a more economical utilization of the seats within a motion picture theater so that a greater seating capacity may be obtained.

It is a further object of this invention to provide a means for operating a number of motion picture projectors simultaneously, so that the same picture may be projected at a number of different points in synchronism, accompanied by synchronous sound reproduction.

In carrying out my invention the method of projection used is that known as backstage projection which means that the audience is on the opposite side of the screen from the projector. A number of projectors are used corresponding to the number of screens, and each projector is run in synchronism and supplied with an identical film.

In the reproduction of talking motion pictures in accordance with my invention, a single sound reproducing apparatus may be used, controlled by any of the films in use, or by an independent record, as desired.

The auditorium is arranged in a polygonal manner, the number of sides depending upon the permitted angle of the spectator with respect to the screen. In the embodiment shown, this angle is limited to 30 degrees which gives very good results, and thus a complete theater would consist of six sections, and in each of these sections there would be no side seats from which the spectator could not easily and comfortably view the screen.

Having thus briefly described my invention, attention is now invited to the accompanying drawing in which.

Figure 1:
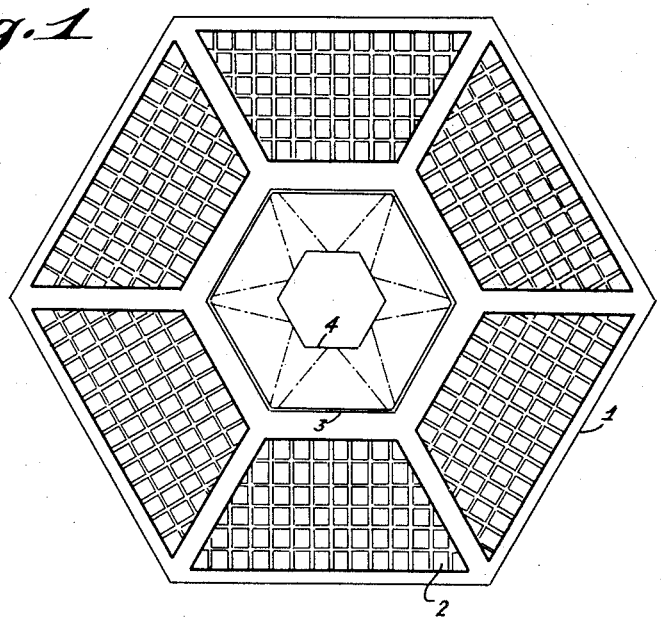
Fig. 1 shows a plan view of a theater constructed in accordance with the present invention.

Referring now more particularly to Fig. 1, in the theater shown, the audience is placed in seats arranged so as to occupy a polygon or more particularly a hexagon, and consequently, six screens are used. 1 represents the outside wall of the theater, and 2 represents the seats. A plurality of screens 3 are arranged in a hexagonal form, completely enclosing the projecting room 4. By this arrangement one sixth of the total audience views the projection upon each of the screens. The screens 3 are made of translucent material, and the audience thus views the light transmitted through the screen from the projector in the projecting room 4.

Figure 2:
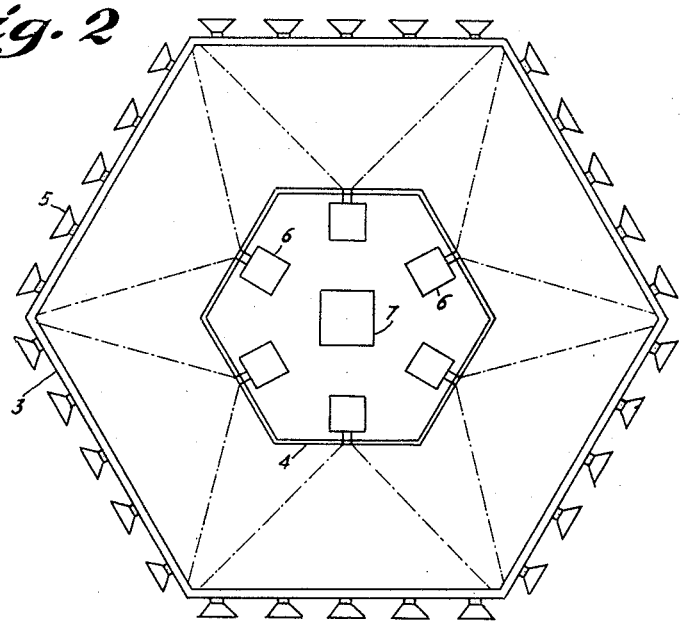
Fig. 2 represents the screen and projection room more in detail.

Referring now more particularly to Fig. 2, which is an enlarged view of the projecting room and screens, 3 represents the screens, and 4 the projecting room. Around the border of each screen are disposed a plurality of loud speaker devices 5. Arranged to project upon each of the screens is a projector 6, each of said projectors being geared or otherwise arranged to run in synchronism by any desirable means. The sound reproducing apparatus 7 may take the form of a film phonograph or an ordinary phonograph, or the sound may be produced by a sound motion picture projector used in place of any of the projectors 6, in which case 7 would represent the sound amplifying apparatus adapted to supply the accompanying sounds to the loud speaking devices 5.

All of the projectors and film phonographs are arranged to operate synchronously as by gearing or by synchronous motors, and are stopped and started simultaneously. It is understood of course, that in order to provide for continuous performance, all of the apparatus may be duplicated, one set of projectors being associated with one film phonograph or amplifier, and the second set associated with a second film phonograph or amplifier. It is abvious that a single operator may control the operation of either group of reproducing equipment.

It is obvious that various modifications of this system might be employed, as for instance, the projectors might be mounted at the rear of the auditoriums and the various machines operated by synchronous motors by remote control from a central room in which the film phonograph or amplifying equipment might be located.

It is also obvious that the same arrangement might be extended to cover a group of theaters geographically separated.

Having thus described my invention, it is to be understood, that I am not to be limited by the specific embodiment shown and described for the purpose of illustration only, but by the scope of my invention as set forth in the appended claims.

What I claim is:

1. The combination of an enclosure provided with translucent walls, a projection room located within said enclosure, a plurality of projectors each arranged in said room to project pictures upon a different one of said walls, loud speakers mounted in proximity to said walls, and a film phonograph operated in synchronism with said projectors and located in said room for controlling the operation of said loud speakers.

2. The combination of an enclosure provided with translucent walls, a projection room located within said enclosure, a plurality of projectors each arranged in said room to project pictures upon a different one of said walls, loud speakers mounted in proximity to said walls, a film phonograph operated in synchronism with said projectors and located in said room for controlling the operation of said loud speakers, and a plurality of seating sections each arranged to face a different one of said walls.

3. The combination of an enclosure provided with translucent wall sections, a projection room located within said enclosure, a plurality of moving picture projectors arranged in said room simultaneously to project pictures upon said walls, and means operated in synchronism with said projectors for causing sound to be produced in proximity to said wall sections.

JULIUS WEINBERGER.